United States Patent
Perincherry et al.

(10) Patent No.: US 10,373,074 B2
(45) Date of Patent: Aug. 6, 2019

(54) ADAPTIVE CORRELATION OF USER-SPECIFIC COMPRESSED MULTIDIMENSIONAL DATA PROFILES TO ENGAGEMENT RULES

(71) Applicant: Indiggo Associates LLC, Bethesda, MD (US)

(72) Inventors: Vijay Perincherry, Potomac, MD (US); Janine Gelbart, Bethesda, MD (US); Marc Inzelstein, Rockville, MD (US)

(73) Assignee: Indiggo Associates LLC, Bethesda, MD (US)

( * ) Notice: Subject to any disclaimer, the term of this patent is extended or adjusted under 35 U.S.C. 154(b) by 762 days.

(21) Appl. No.: 15/092,351

(22) Filed: Apr. 6, 2016

(65) Prior Publication Data
US 2017/0293855 A1   Oct. 12, 2017

(51) Int. Cl.
| | |
|---|---|
| *G06N 20/00* | (2019.01) |
| *G06N 5/02* | (2006.01) |
| *G06F 16/907* | (2019.01) |

(52) U.S. Cl.
CPC .......... *G06N 20/00* (2019.01); *G06F 16/907* (2019.01); *G06N 5/022* (2013.01)

(58) Field of Classification Search
CPC ....... G06F 16/907; G06N 5/022; G06N 20/00
See application file for complete search history.

(56) References Cited

U.S. PATENT DOCUMENTS

| | | | |
|---|---|---|---|
| 2011/0307328 A1* | 12/2011 | Crites ............... | G06O 30/0201 705/14.45 |
| 2012/0246302 A1* | 9/2012 | Lafleur ................. | G06Q 30/02 709/224 |
| 2013/0262483 A1 | 10/2013 | Blom et al. | |

(Continued)

FOREIGN PATENT DOCUMENTS

WO   2014040175 A1   3/2014

OTHER PUBLICATIONS

Extended European Search Report for EP Patent Application 17165376.9 dated Aug. 17, 2017.

(Continued)

*Primary Examiner* — Scott A. Waldron
(74) *Attorney, Agent, or Firm* — Cooley LLP

(57) ABSTRACT

Some embodiments relate generally to the processing of compressed multidimensional data and selection of engagement rules based on the compressed multidimensional data. In some embodiments, a method includes retrieving, via a processor, a multidimensional data profile that includes a set of first inclination distributions, each associated with a data dimension. The processor matches a first set of engagement rules to the multidimensional data profile to define a matched set, each engagement rule of the first set of engagement rules having a corresponding confidence level and a corresponding set of second inclination distributions. The processor selects an engagement rule from the matched set that has a corresponding confidence level no less than a corresponding confidence level for each remaining engage- (Continued)

ment rule from the matched set, and sends a signal causing display of a stimulus to a user according to the selected engagement rule and not according to the remaining engagement rules.

17 Claims, 4 Drawing Sheets

(56) References Cited

U.S. PATENT DOCUMENTS

| | | | |
|---|---|---|---|
| 2013/0266918 A1* | 10/2013 | Tinjust | A63B 69/0053 434/247 |
| 2017/0294037 A1 | 10/2017 | Perincherry et al. | |
| 2017/0316322 A1 | 11/2017 | Perincherry et al. | |

OTHER PUBLICATIONS

Extended European Search Report dated Aug. 16, 2017, in European Application No. 17165375.1 filed on Apr. 6, 2016, 6 pages.

\* cited by examiner

ADAPTIVE CORRELATION OF USER-SPECIFIC COMPRESSED MULTIDIMENSIONAL DATA PROFILES TO ENGAGEMENT RULES

CROSS-REFERENCE TO RELATED PATENT APPLICATIONS

This patent application is related to U.S. Patent Application Publication No. US 2017/0294037, published on Oct. 12, 2017 and entitled "Apparatus and Methods for Generating Data Structures to Represent and Compressed Data Profiles," the entire contents of which are hereby incorporated by reference.

FIELD OF THE DISCLOSURE

Embodiments described herein relate generally to adaptive systems, and more specifically to adaptive systems that correlate compressed multidimensional data profiles and engagement rules to dynamically adapt the engagement rules.

BACKGROUND

Tools to assess the behaviour of diverse users and diverse types of user exist, but suffer from a lack of effectiveness, in part due to static rules often used. Such users can differ significantly and typically do not behave in a static manner. Rather, the behaviors of such user can often be too complex for the application of a priori rules, and these complex behaviors can change over time. Thus, a need exists for an adaptive system (or apparatus or method) that adjusts to take into account the complexity of user behaviors and the changes in user behaviors over time.

SUMMARY

Some embodiments described herein relate generally to the processing of user-specific compressed multidimensional data profiles and the selection of engagement rules based on the compressed multidimensional data profiles. In some embodiments, a method includes retrieving, via a processor, a compressed multidimensional data profile that includes a set of first inclination distributions, each associated with a data dimension. The processor matches a first set of engagement rules to the compressed multidimensional data profile to define a matched set, each engagement rule of the first set of engagement rules having a corresponding confidence level and a corresponding set of second inclination distributions. The processor selects an engagement rule from the matched set that has a corresponding confidence level no less than a corresponding confidence level for each remaining engagement rule from the matched set, and sends a signal causing display of a stimulus to a user according to the selected engagement rule and not according to the remaining engagement rules.

DETAILED DESCRIPTION

Effective engagement with individuals, for example via a software platform, occurs when the engagement is in alignment with or consistent with the individual's mindset (represent herein using a "mindset profile," "multidimensional data profile," or "compressed multidimensional data profile"), actions and/or choices. Embodiments described herein include methods of selecting and dynamically adapting rules of engagement with individuals (or "engagement rules"), and patterns thereof, based on the effectiveness of the rules and based on compressed multidimensional data profiles associated with the individuals. In other words, adaptive systems, apparatus and methods such as those described herein can dynamically adapt rules of engagement with users/individuals based on prior behaviors (e.g., as represented by the compressed multidimensional data profiles) and confidence levels associated with particular engagement rules in light of prior behaviors. The adaptive systems, apparatus and methods described herein can automatically deliver guidance and instructions to individuals through computer applications based on the rules. In some embodiments, a method includes retrieving, via a processor, a compressed multidimensional data profile that includes a set of first inclination distributions, each associated with a data dimension. The processor matches a first set of engagement rules to the compressed multidimensional data profile to define a matched set, each engagement rule of the first set of engagement rules having a corresponding confidence level and a corresponding set of second inclination distributions. The processor selects an engagement rule from the matched set that has a corresponding confidence level no less than a corresponding confidence level for each remaining engagement rule from the matched set, and sends a signal causing display of a stimulus to a user according to the selected engagement rule and not according to the remaining engagement rules.

Figure 1:
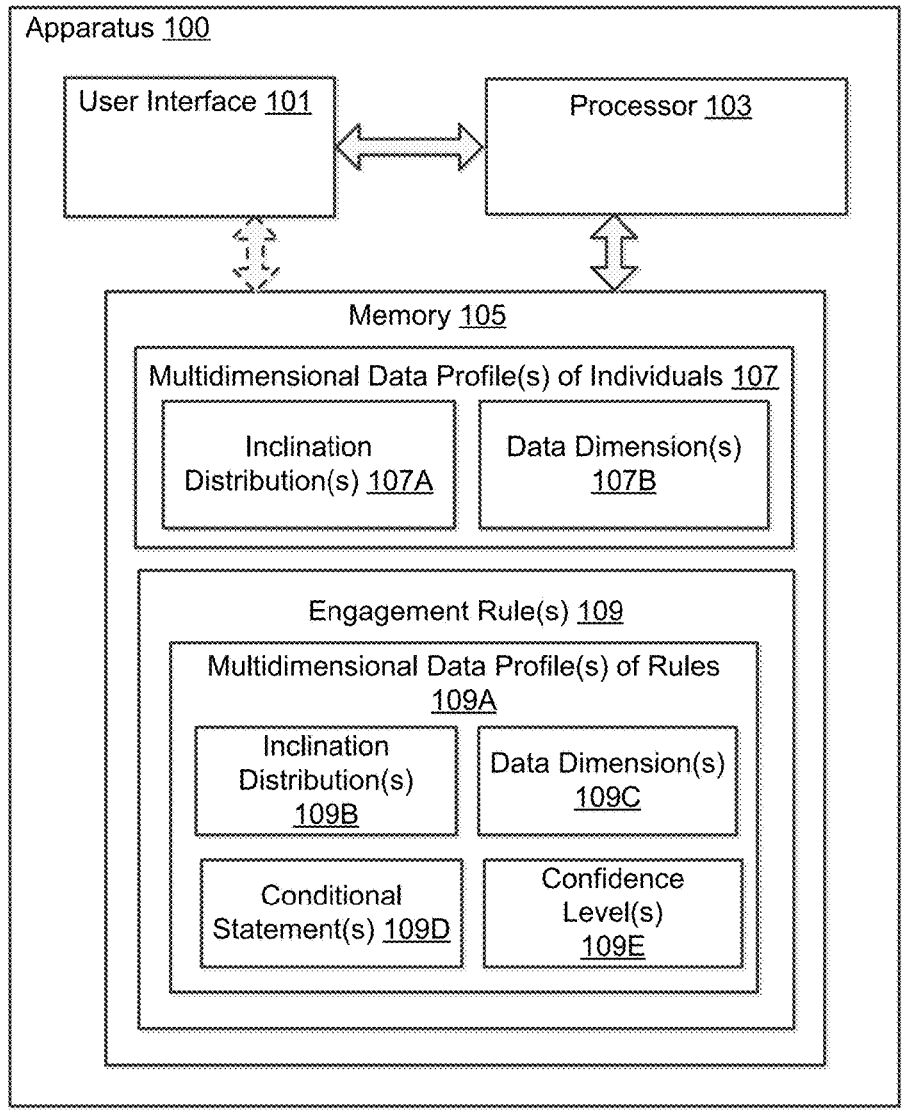
FIG. 1 illustrates a system block diagram of an apparatus for engagement rule selection based on compressed multidimensional data profiles, according to an embodiment.

FIG. 1 illustrates a system block diagram of an apparatus, according to an embodiment. As shown in FIG. 1, an apparatus 100 includes a user interface 101 operably coupled to a processor 103, and a memory 105 operably coupled to the processor 103 and, optionally, to the user interface 101. The user interface 101 is configured to display content (also referred to herein as one or more "engagements") to a user, and can include one or more of a software application ("app"), a graphical user interface (GUI), and an input device such as a touchscreen, keyboard, mouse, keypad, etc. Engagements can include for example interactive forms or graphics, prompts, text messages, pop-up windows, calendar reminders, emails, meeting requests, hyperlinks, news articles, and/or the like. The user interface 101 can be running on and/or accessible via a user device such as a desktop or laptop computer, or a mobile device such as a Blackberry® or an iPhone®. The processor 103 can be implemented using a microprocessor, such as an application-specific integrated circuit (ASIC), a central processing unit (CPU) with local memory (e.g., read-only memory (ROM)), a general purpose processor, etc. The memory 105 can include a volatile memory (e.g., random access memory (RAM)) and/or a non-volatile memory, such as read-only memory (ROM), programmable read-only memory (PROM), erasable programmable read-only memory (EPROM), electrically erasable programmable read-only memory (EEPROM) and/or the like. The memory 105 stores data including one or more compressed multidimensional data profiles of individuals 107 and a set of engagement rules 109. Memory 105 can also store processor-issuable instructions (or processor-readable instructions), which can cause the processor 103 to perform processes described herein In some embodiments, a multidimensional data profile 107 is a compressed data structure that includes a vector representation of an individual's preferences or "leanings" (also referred to herein as "inclination distributions 107A") associated with each of a set of attitudinal factors or "data dimensions 107B" of interest. An inclination distribution 107A can have a unimodal or a multimodal distribution. The multidimensional data profile 107 can be generated through a series of interactions of the individual with the user interface 101. Each multidimensional data profile 107 is therefore associated with an individual or user, and includes one or more inclination distributions 107A and one or more associated dimensions 107B. For example, for the dimension 107B related to self-awareness, the inclination distributions 107A (leanings) can be presented, for example, on a scale of one to ten, where a value of one represents "unaware" and a value of ten represents "extremely self-aware." For another example, for the dimension 107B related to action-oriented, the inclination distributions 107A (leanings) can be represented, for example, on a scale of one to ten, where a value of one represents "reluctant" and a value of ten represents "eager to act". Multidimensional data profiles, and the related inclination values and dimensions, are discussed in more detail in U.S. Patent Application Publication No. US 2017/0294037, entitled "Apparatus and Methods for Generating Data Structures to Represent and Compress Data Profiles," the entire contents of which are incorporated herein by reference.

Each engagement rule of the set of engagement rules 109 also includes an associated predetermined multidimensional data profile 109A, which in turn includes one or more inclination distributions 109B and one or more associated dimensions 109C. In some embodiments, the multidimensional data profiles of individuals 107 and the multidimensional data profiles of rules 109A have the same or similar structure. The multidimensional data profiles of rules 109A, however, are predetermined rather than generated through a series of interactions with an individual or user. Each engagement rule of the set of engagement rules 109 also includes one or more associated conditional statements 109D and one or more associated confidence levels 109E (e.g., represented as a value between 0 and 1).

An engagement rule 109 is an independent entity within an overall population of engagement rules (or "rule base"), and in some implementations an engagement rule 109 includes three components, for example:
- an antecedent clause that is contained within the IF statement (i.e., a "condition");
- a consequent clause that is contained with the THEN statement (i.e., an "outcome"); and
- a degree of certainty or "confidence" associated with the rule.

The antecedent clause and the consequent clause, collectively, define a conditional statement 109D. In some embodiments, a conditional statement 109D of an engagement rule 109 is structured as follows:

IF (individual is of type T1)
THEN (engage using engagement/content type C1).

In the example of an engagement rule 109 shown above, the type T1 of an individual is defined on the basis of combining the individual's multidimensional data profile 107 (referred to herein as "M1") with a vector representing the individual's specific actions ("A1"), and a vector representing the individual's specific choices S1. An action can be something an individual does through the user interface 101 of the apparatus 100, including for example making a selection (e.g., mouse click), scheduling a meeting they organize, sharing a summary, etc. A choice can be action chosen by an individual from an array of possible actions including for example optical answers to questions, responses to proffered situations, etc. A typical rule base includes several engagement rules 109 that relate specific combinations of multidimensional data profiles 107, actions and choices, to associated content types C1. A content type can be the type of information provided to the individual, for example, in response to actions and choices. For example, the content can be an article, a message, an email, a notification; thus, the content type indicates that type or category of information appropriate for a given individual. Each engagement rule 109 in the rule base has an associated confidence level 109E, which is a numeric measure of the validity of the engagement rule 109. The most appropriate content for engagement with a given individual is determined based on the confidence levels 109E of the engagement rules 109 that match the type of the individual (e.g., as determined by the processor 103 based, at least in part, on the individual's multidimensional data profile 107). For example, in some embodiments, an engagement rule 109 rule is selected by the processor 103 when the antecedent clause of the engagement rule 109 is satisfied, or upon "qualification" of the antecedent clause (e.g., when there is a Boolean match of the antecedent clause). The consequent clause is relevant only if the antecedent clause is true. Rule selection can also be based on a measure that combines the qualification of the antecedent clause with the associated confidence level 109E. The processor 103 can be configured to update the confidence level 109E over time, for example, based upon interactions of an individual with the apparatus 100 via the user interface 101 is response to one or more engagements selected by the apparatus 100 using the engagement rules 109.

Qualification of the antecedent clause can be performed using a multivalued match, which represents a degree of match between an individual's multidimensional data profile 107 and the multidimensional data profile 109A associated with the antecedent clause of the engagement rule 109 under consideration. A mathematical matching "(m)" of multidimensional data profiles can be defined as:

$$M(I)(m)M(R) = \text{Aggregation over all } X \text{ of } (ID(X,I)(m) ID(X,R))$$

where $M(I)$ is the multidimensional data profile of an individual I, $M(R)$ is the multidimensional data profile defined in the antecedent of the rule R, $ID(X,I)$ is an inclination distribution of individual I on dimension X, and $ID(X,I)$ is the inclination distribution specified in rule R dimension X.

Depending upon the structure of the rule, the aggregation over all X of (ID(X,I) (m) ID(X, R)) can vary from min( ) for AND combinations to max( ) for OR combinations. The operator (m) is a non-commutative property. In other words, ID(X, I) (m) ID(X,R) is defined as follows:

$$ID(X, I)(m)ID(X, R) = \frac{\left(\Sigma(\min(\text{lean}(X, I)_i, \text{lean}(X, R)_i)), i=1, \frac{10}{(\min(\text{inc}(X, I), \text{inc}(X, R)))}\right)}{\left(\Sigma(\text{lean}(X, I)_i), i=1, \frac{10}{(\min(\text{inc}(X, I), \text{inc}(X, R)))}\right)} \quad (1.1)$$

whereas ID(X,R) (m) ID(X, I) is defined as:

$$ID(X, R)(m)ID(X, I) = \frac{\left(\Sigma(\min(\text{lean}(X, I)_i, \text{lean}(X, R)_i)), i=1, \frac{10}{(\min(\text{inc}(X, I), \text{inc}(X, R)))}\right)}{\left(\Sigma(\text{lean}(X, R)_i), i=1, \frac{10}{(\min(\text{inc}(X, I), \text{inc}(X, R)))}\right)}, \quad (1.2)$$

where (m) is a matching operator, X is a data dimension of a set of data dimensions, ID(X,I) is an inclination distribution of a set of first inclination distributions, ID(X,R) is an inclination distribution of a set of second inclination distributions of an engagement rule R of a set of engagement rules, inc(X, I) is a time increment of the inclination distribution of the set of first inclination distributions, inc(X, R) is a time increment of the inclination distribution of the set of second inclination distributions, lean(X, I) is a value of an inclination distribution of the set of first inclination distributions, and lean(X, R) is a value of an inclination distribution of the set of second inclination distributions.

Figure 2:
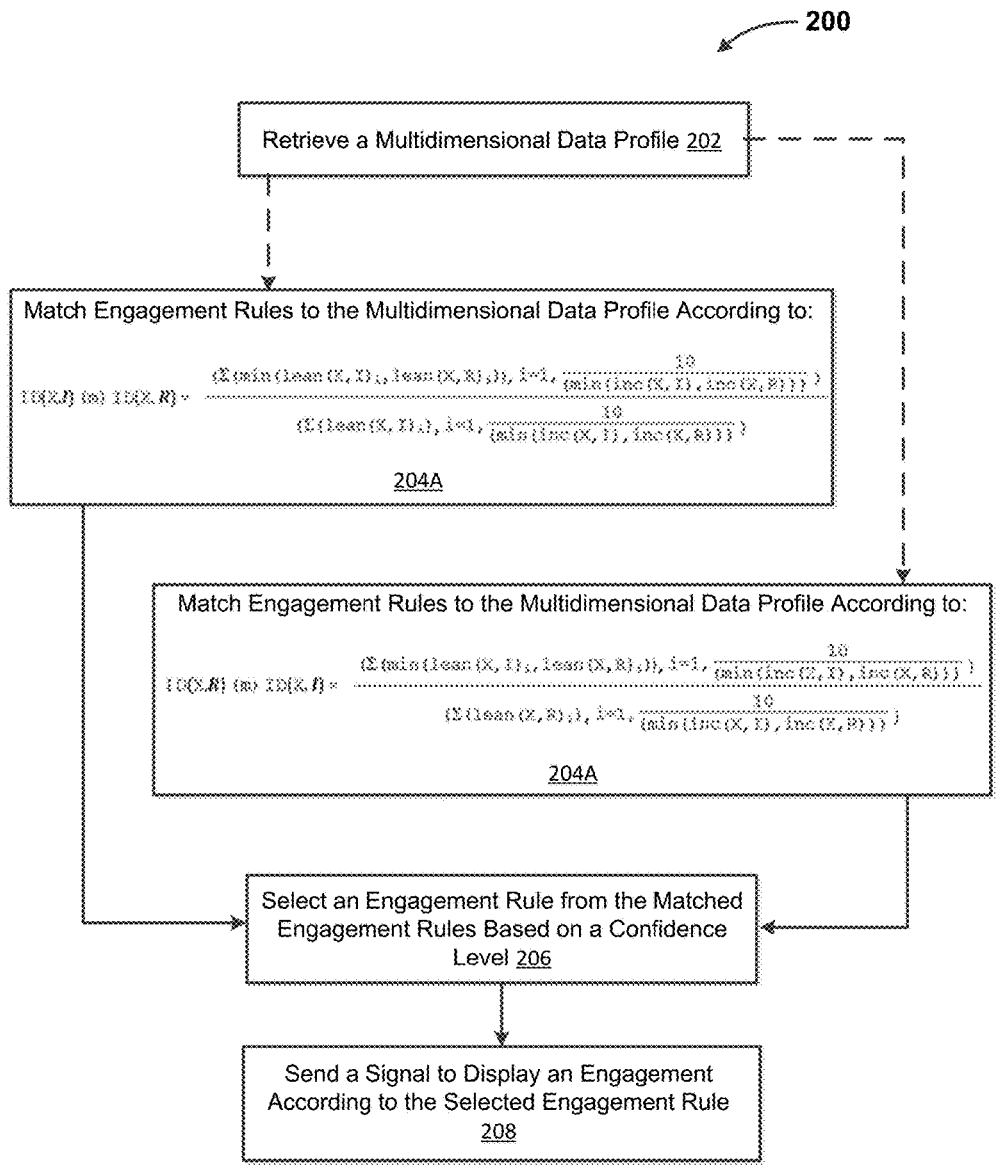
FIG. 2 is a flow diagram illustrating a method for selecting an engagement rule based on compressed multidimensional data profiles, according to an embodiment.

FIG. 2 is a flow diagram illustrating a method, compatible with the apparatus of FIG. 1, for selecting an engagement rule based on multidimensional data profiles, according to an embodiment. As shown in FIG. 2, the method 200 includes retrieving (e.g., via a processor, such as processor 103 of FIG. 1) a multidimensional data profile of an individual at 202, and subsequently matching one or more engagement rules to the individual's multidimensional data profile via one of equations (1.1) and (1.2) above, to define a "matched set." An engagement rule is then selected from the matched set of engagement rules, based on a confidence level of the engagement rules of the matched set, at 206. The processor then sends a signal (e.g., to the user interface) to display an engagement (or "stimulus") to the individual according to the selected engagement rule, at 208. In some instances, after the method 200 has been performed the multidimensional data profile of the individual and/or the selected engagement rule can be iteratively modified based on a response(s) to the engagement.

In some instances, the one or more engagement rules is a first set of engagement rules, and the method 200 can match a second set of engagement rules to the individual's multidimensional data profile to define a second matched set of engagement rules. The processor then selects an engagement rule of the second matched set of engagement rules that has a corresponding confidence level no less than the corresponding confidence level for each remaining engagement rule from the second matched set of engagement rules. The processor then sends a signal (e.g., to the user interface) to display a second engagement to the individual according to the selected engagement rule of the second matched set of engagement rules.

In other words, the method of FIG. 2 can be performed interactively for a given individual (as well as for multiple individuals) so that the multidimensional data profile for an individual is revised and the engagement rules for multiple individuals are revised. In other words, as more is learned about an individual, the multidimensional data profile is updated and improved; similarly, as more is learned about individuals, the engagement rules are improved for better future engagements.

Figure 3:
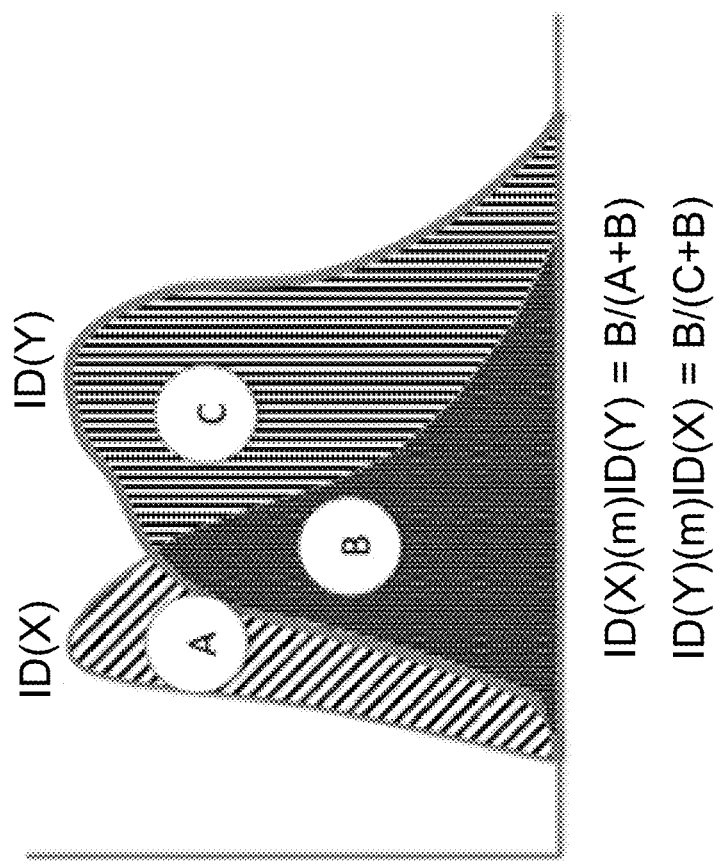
FIG. 3 is a plot illustrating a matching operation, according to an embodiment.

FIG. 3 is a plot illustrating a matching operation, according to an embodiment. In the example of FIG. 3, the x-axis represents the leaning value from a value of one to ten, and the y-axis represents the continuous possibility distribution from a value of one to ten. As shown in FIG. 3, given two distributions/curves ID(X) and ID(Y) (defining areas "A," corresponding to an individual's multidimensional data profile, and "C," corresponding to a rule's multidimensional data profile, respectively), region "B" is a region of overlap between ID(X) and ID(Y). The equation ID(X)(m)ID(Y) measures the proportion of area A that overlaps with area B, and the equation ID(Y)(m)ID(X) measures the proportion of area C that overlaps with area B. In other words, each of ID(X)(m)ID(Y) and ID(Y)(m)ID(X) measures a degree of containment of one entity in another, but the equations are non-commutative. The total measure of "match" for an engagement rule takes into account all multidimensional data profiles featured in the rule. In other words, multiple individual "match" operations between multidimensional data profiles of various individuals and rules may be performed by the processor as part of an aggregate match operation.

In some embodiments, matching an engagement rule using a rule's multidimensional data profile that is completely unspecified or not yet defined (e.g., such that all values are possible: ({1,10},{1})) will return a match value of 1.0. Also, the total measure of match for individual multidimensional data profiles not specified in any rule can also have a value of 1.0. If an engagement rule does not specify any multidimensional data profiles at all, individuals of all multidimensional data profiles will be matched to the engagement rule. In other words, referring back to FIG. 3, area B will include/cover the entirety of the individual's inclination distribution (e.g., the entirety of ID(X)), such that the match will be A/B=1. If the individual's multidimensional data profile is unknown or not yet defined, the engagement rule match will be very low. In other words, area B will include/cover only the inclination distribution specified by the engagement rule, such that A=1−B. The match will be B, which is <1. In some instances, the match has a nonzero value when an individual's multidimensional data profile is not known.

In some implementations, an engagement rule is selected by a processor, at least in part, based on its effectiveness. The effectiveness of an engagement rule is based on whether a desired outcome has been achieved as a result of one or more prior engagements or communications with an individual (e.g., via a user interface) that were performed in accordance with a previously-selection engagement rule. An outcome can include one or more desired responses from the individual, and an engagement can have one or more desired outcomes associated with it. Effectiveness is measured as a degree of achievement of the desired objective.

As discussed above, an engagement rule can be selected by a processor at least in part based on an associated confidence level. The confidence level ("CONF") associated with an engagement rule can be represented using a real number, for example within a range (−1,+1) where −1 indicates that the engagement rule is completely invalid, and +1 indicates that the rule is completely valid. Effectiveness (eff) can also be represented using a real number in the range (−1,+1). CONF can be adjusted on the basis of the value of eff, using the following formula:

If eff > 0:
    CONF1 = CONF0 + (1−CONF)*eff
If eff < 0:
    CONF1 = CONF0 − (CONF0+1)*abs(eff)

where CONF0 is a level of confidence associated with the engagement rule prior to the measure of effectiveness eff, and CONF1 is a modified level of confidence associated with the engagement rule after the measure of effectiveness eff, and abs is the absolute value.

Figure 4:
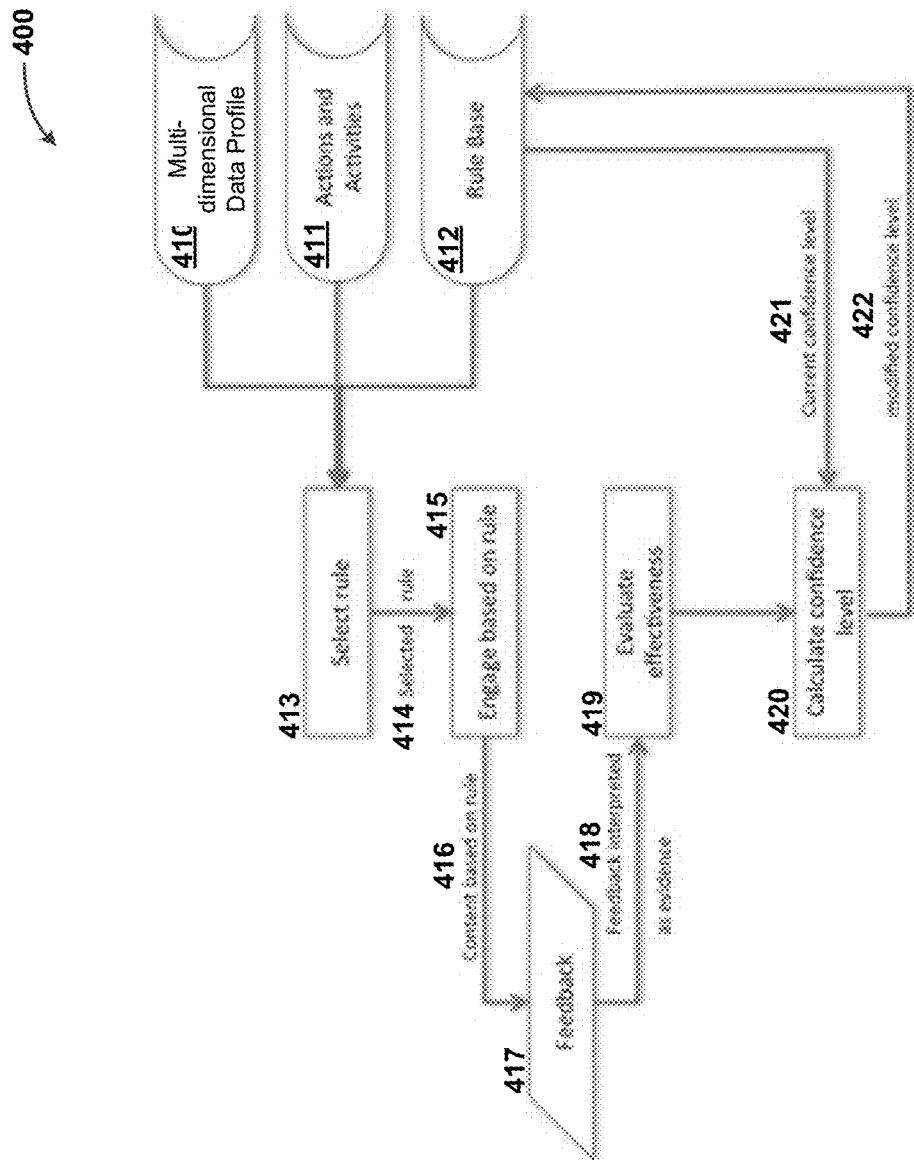
FIG. 4 is a process flow diagram illustrating the modification of confidence levels pertaining to rules, according to an embodiment.

In some embodiments, an adaptive or self-organizing system (e.g., the apparatus 100 of FIG. 1) includes a processor that processes responses, received via a user interface from an individual, to determine an effectiveness of one or more engagements (e.g., selected by the processor according to an engagement rule and displayed to the individual via the user interface), and automatically adjusts the confidence levels of engagement rules, as shown in the process flow diagram of FIG. 4. As shown in FIG. 4, the confidence levels of one or more engagement rules can be modified via a process 400 as follows: one or more individual multidimensional data profiles ("mindset profiles") 410, one or more actions or activities 411 (e.g., by an individual via a user interface), and one or more engagement rules of a rule base 412, for example each stored in respective databases or tables in memory (e.g., memory 105), are accessed by a processor (e.g., processor 103). Based on the individual multidimensional data profiles 410, the actions or activities 411 and the engagement rules of the rule base 412, the processor selects an engagement rule at 413 (for example, using the apparatus 100 of FIG. 1 and/or the method 200 of FIG. 2), and an engagement (including content 416) is presented to the individual (e.g., via the user interface) according to the selected rule 414, at 415. Feedback is generated at 417, for example by the individual interacting with the user interface in response to or as a part of the engagement and received at the processor where the feedback (also referred to as "evidence") is interpreted at 418. The selected engagement rule (selected at 413) that formed the basis for the engagement is then evaluated by the processor, at 419, for its effectiveness, and at 420 for its associated confidence level. The confidence level that is calculated at 420 is based at least in part on a current confidence level 421 that may be retrieved from memory, and if the confidence level that is calculated at 420 differs from the confidence level 421 that was retrieved from memory, a modified confidence level is stored in the memory at 422. This can allow the adaptive system/process to adapt to the changes in confidence levels over time so that future correlation of multidimensional data profiles and engagement rules can also dynamically adapt over time.

Note that the examples of an adaptive system/process described herein can be used in the context of leadership development. For example, the stimuli/actions provided to a user/individual (e.g., through a user interface) can be dynamically adapted in the future depending on the behavior changes by the user/individual, for example, as evidenced by the responses/actions by the user/individual. These responses/actions by the user/individual can be used to adapt the confidence levels for a given engagement rule(s). As a result, future correlation of multidimensional data profiles to the engagement rules will be dynamically adapted over time as a result of the user/individual behavior. This can result in better recommendations (e.g., more effective for that user/individual) and output to the user/individual, thereby achieving better leadership outcomes.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate systems may be performed by the same system, and functionality illustrated to be performed by the same system may be performed by separate systems. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in multiple units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The invention claimed is:
1. A method, comprising:
retrieving, via a processor, a compressed multidimensional data profile including a plurality of first inclination distributions, each first inclination distribution from the plurality of first inclination distributions being associated with a data dimension of a plurality of data dimensions;
matching, via the processor, a first plurality of engagement rules to the compressed multidimensional data profile to define a matched plurality of engagement rules, each engagement rule of the first plurality of engagement rules having a corresponding confidence level and a corresponding plurality of second inclination distributions;
selecting, via the processor, an engagement rule from the matched plurality of engagement rules that has a corresponding confidence level no less than a corresponding confidence level for each remaining engagement rule from the matched plurality of engagement rules; and
sending, via the processor, a signal causing display of a stimulus to a user according to the engagement rule of the matched plurality of engagement rules and not according to the remaining engagement rules,
the matching the first plurality of engagement rules to the compressed multidimensional data profile including one of:

$$ID(X, I)(m)ID(X, R) = \frac{\left(\Sigma(\min(\text{lean}(X, I)_i, \text{lean}(X, R)_i)), i = 1, \frac{10}{(\min(inc(X, I), inc(X, R)))}\right)}{\left(\Sigma(\text{lean}(X, I)_i), i = 1, \frac{10}{(\min(inc(X, I), inc(X, R)))}\right)};$$

and $$ID(X, R)(m)ID(X, I) = \frac{\left(\Sigma(\min(\text{lean}(X, I)_i, \text{lean}(X, R)_i)), i = 1, \frac{10}{(\min(inc(X, I), inc(X, R)))}\right)}{\left(\Sigma(\text{lean}(X, R)_i), i = 1, \frac{10}{(\min(inc(X, I), inc(X, R)))}\right)},$$

where (m) is a matching operator, X is a data dimension of the plurality of data dimensions, ID(X,I) is an inclination distribution of the plurality of first inclination distributions, ID(X,R) is an inclination distribution of the plurality of second inclination distributions of an engagement rule R of the first plurality of engagement rules, inc(X, I) is a time increment of the inclination distribution of the plurality of first inclination distributions, inc(X, R) is a time increment of the inclination distribution of the plurality of second inclination distributions, lean(X, I) is a value of the inclination distribution of the plurality of first inclination distributions, and lean(X, R) is a value of the inclination distribution of the plurality of second inclination distributions.

2. The method of claim 1, further comprising iteratively modifying the compressed multidimensional data profile and/or the first plurality of engagement rules based on a response to the stimulus.

3. The method of claim 1, further comprising:
receiving a response to the stimulus;
defining an effectiveness of at least one engagement rule of the matched plurality of engagement rules based on the response; and
modifying the confidence level of the at least one engagement rule of the matched plurality of engagement rules according to:

$CONF1=CONF0+(1-CONF0)*\text{eff}$ if $\text{eff}>0$; and $CONF1=CONF0-(CONF0+1)*|\text{eff}|$ if $\text{eff}<0$, where CONF0=the confidence level of the at least one engagement rule of the matched plurality of engagement rules, CONF1=a modified confidence level, and "eff" is the effectiveness of the at least one engagement rule of the matched plurality of engagement rules, so as to define a second plurality of engagement rules.

4. The method of claim 3, wherein the stimulus is a first stimulus and the matched plurality of engagement rules is a first matched plurality of engagement rules, the method further comprising:
matching the second plurality of engagement rules to the compressed multidimensional data profile to define a second matched plurality of engagement rules;
selecting an engagement rule of the second matched plurality of engagement rules that has corresponding confidence level no less than the corresponding confidence level for each remaining engagement rule from the second matched plurality of engagement rules; and
displaying a second stimulus to the user according to the selected engagement rule of the second matched plurality of engagement rules.

5. The method of claim 1, wherein at least one first inclination distribution of the plurality of first inclination distributions is a multimodal distribution.

6. The method of claim 1, wherein at least one second inclination distribution of the plurality of second inclination distributions is a multimodal distribution.

7. An apparatus, comprising:
a user interface configured to display a plurality of stimuli to a user and to receive from the user a plurality of responses associated with the plurality of stimuli;
a memory operably coupled to the user interface and configured to store a compressed multidimensional data profile associated with the user; and
a processor operably coupled to the memory and configured to:
retrieve the compressed multidimensional data profile from the memory;
match a set of engagement rules to the compressed multidimensional data profile to produce a matched set of engagement rules;
select an engagement rule of the matched set of engagement rules that has a corresponding confidence level no less than a corresponding confidence level for each remaining engagement rule from the matched set of engagement rules; and
send a signal to cause the user interface to display a stimulus of the plurality of stimuli to the user via the user interface based on the engagement rule of the matched set of engagement rules, the matching the set of engagement rules to the compressed multidimensional data profile being performed according to:

$$ID(X, I)(m)ID(X, R) = \frac{\left(\Sigma(\min(\text{lean}(X, I)_i, \text{lean}(X, R)_i)), i=1, \frac{10}{(\min(\text{inc}(X, I), \text{inc}(X, R)))}\right)}{\left(\Sigma(\text{lean}(X, I)_i), i=1, \frac{10}{(\min(\text{inc}(X, I), \text{inc}(X, R)))}\right)},$$

where (m) is a matching operator, X is a data dimension of a plurality of data dimensions, ID(X,I) is an inclination distribution of a first plurality of inclination distributions, ID(X,R) is an inclination distribution of a second plurality of inclination distributions, inc(X, I) is a time increment of the inclination distribution of the first plurality of inclination distributions, inc(X, R) is a time increment of the inclination distribution of the second plurality of inclination distributions, lean(X, I) is a value of the inclination distribution of the first plurality of inclination distributions, and lean(X, R) is a value of the inclination distribution of the second plurality of inclination distributions.

8. The apparatus of claim 7, wherein the processor is further configured to:
store, in the memory, a plurality of confidence levels, each confidence level from the plurality of confidence levels corresponding to an engagement rule of the set of engagement rules; and
modify at least one confidence level of the plurality of confidence levels based on an input received via the user interface in response to the displayed stimulus.

9. The apparatus of claim 7, wherein:
each inclination distribution from the first plurality of inclination distributions corresponds to a data dimension, and
each inclination distribution from the second plurality of inclination distributions corresponds to a data dimension.

10. The apparatus of claim 9, wherein at least one inclination distribution of the plurality of inclination distributions has a multimodal distribution.

11. The apparatus of claim 9, wherein the processor is further configured to match the set of engagement rules to the compressed multidimensional data profile based on an aggregation of overlaps between: (1) inclination distributions of the first plurality of inclination distributions; and (2) inclination distributions of the second plurality of inclination distributions and having the data dimension that corresponds to the data dimension of each inclination distributions of the first plurality of inclination distributions.

12. An apparatus, comprising:
a user interface configured to display a plurality of stimuli to a user and to receive from the user a plurality of responses associated with the plurality of stimuli;
a memory operably coupled to the user interface and storing: (1) a compressed multidimensional data profile associated with the user, the compressed multidimensional data profile including a first plurality of inclination distributions; and (2) a set of engagement rules, each engagement rule of the set of engagement rules including an associated second plurality of inclination distributions; and
a processor operably coupled to the memory and configured to:
retrieve the compressed multidimensional data profile from the memory;
match the compressed multidimensional data profile to the set of engagement rules to produce a matched set of engagement rules based on the first plurality of inclination distributions and the second pluralities of inclination distributions;
select an engagement rule of the matched set of engagement rules; and
send a signal to cause the user interface to display a stimulus of the plurality of stimuli to the user via the user interface based on the selected engagement rule,
the matching the compressed multidimensional data profile to the set of engagement rules being performed according to:

$$ID(X, I)(m)ID(X, R) = \frac{\left(\Sigma(\min(\text{lean}(X, I)_i, \text{lean}(X, R)_i)), i=1, \frac{10}{(\min(\text{inc}(X, I), \text{inc}(X, R)))}\right)}{\left(\Sigma(\text{lean}(X, I)_i), i=1, \frac{10}{(\min(\text{inc}(X, I), \text{inc}(X, R)))}\right)},$$

where (m) is a matching operator, X is a data dimension of a plurality of data dimensions, ID(X,I) is an inclination distribution of the first plurality of inclination distributions, ID(X,R) is an inclination distribution of the second plurality of inclination distributions, inc(X, I) is a time increment of the inclination distribution of the first plurality of inclination distributions, inc(X, R) is a time increment of the inclination distribution of the second plurality of inclination distributions, lean(X, I) is a value of the inclination distribution of the first plurality of inclination distributions, and lean(X, R) is a value of the inclination distribution of the second plurality of inclination distributions.

13. The apparatus of claim 12, the processor further configured to iteratively modify the compressed multidimensional data profile based on a response to the stimulus that is received via the user interface.

14. The apparatus of claim 12, the processor further configured to: determine an effectiveness of the selected engagement rule based on a response to the stimulus that is received via the user interface.

15. The apparatus of claim 14, the processor further configured to: modify a confidence level associated with the selected engagement rule based on the effectiveness.

16. The apparatus of claim 12, wherein at least one inclination distribution of the first plurality of inclination distributions is a multimodal distribution.

17. The apparatus of claim 12, wherein at least one inclination distribution of the second plurality of inclination distributions is a multimodal distribution.

* * * * *